United States Patent
Roemer et al.

(10) Patent No.: US 11,124,179 B2
(45) Date of Patent: Sep. 21, 2021

(54) VEHICLE AND METHOD FOR STEERING THE VEHICLE

(71) Applicant: SCHAEFFLER TECHNOLOGIES AG & CO. KG, Herzogenaurach (DE)

(72) Inventors: Juergen Roemer, Karlsruhe (DE); Marcel Philipp Mayer, Neuenbuerg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 173 days.

(21) Appl. No.: 16/323,708

(22) PCT Filed: May 23, 2017

(86) PCT No.: PCT/DE2017/100440
§ 371 (c)(1),
(2) Date: Feb. 6, 2019

(87) PCT Pub. No.: WO2018/036580
PCT Pub. Date: Mar. 1, 2018

(65) Prior Publication Data
US 2019/0168746 A1 Jun. 6, 2019

(30) Foreign Application Priority Data
Aug. 23, 2016 (DE) .......................... 102016215793.0

(51) Int. Cl.
*B60W 30/045* (2012.01)
*B62D 9/00* (2006.01)
*B60W 10/20* (2006.01)

(52) U.S. Cl.
CPC ........... *B60W 30/045* (2013.01); *B62D 9/002* (2013.01); *B60W 10/20* (2013.01)

(58) Field of Classification Search
CPC ...... B60W 10/20; B60W 30/045; B62D 9/002
See application file for complete search history.

(56) References Cited

U.S. PATENT DOCUMENTS 9,896,082 B2    2/2018  Inoue et al.
2011/0297460 A1* 12/2011  Chess ................. B66F 9/07568
                                                                 180/6.66

(Continued)

FOREIGN PATENT DOCUMENTS

CN      102030007 A    4/2011
CN      104843005 A    8/2015

(Continued)

OTHER PUBLICATIONS

Machine Translation of Kato's reference (JP 2006-224936 A) (Year: 2006).*

(Continued)

*Primary Examiner* — Thomas G Black
*Assistant Examiner* — Tarek Elarabi
(74) *Attorney, Agent, or Firm* — Dickinson Wright PLLC

(57) ABSTRACT

A vehicle comprising a steering axle, a steering device configured to steer the steering axle, wherein a steering wheel angle can be input via the steering device, wherein the steering wheel angle leadings to a steering angle of wheels of the steering axle, and a quotient of the steering wheel angle to the steering angle defines a steering ratio, a first drive, wherein the first drive allows a wheel-selective distribution of a first torque to the wheels of the steering axle, a second drive, wherein the second drive allows a wheel-selective distribution of a second torque to the wheels of a drive axle, and a controller configured to receive input variables defining driving dynamic variables of the vehicle, wherein the drive dynamic variables allow a change in the steering ratio to ascertained, and the controller outputs control information for distributing the drive torque.

19 Claims, 5 Drawing Sheets

(56) References Cited

U.S. PATENT DOCUMENTS

2016/0046287 A1* 2/2016 Owen .................. B60W 10/20
                                              701/43
2016/0236679 A1* 8/2016 Inoue .................. B60W 10/20

FOREIGN PATENT DOCUMENTS

| CN | 105691381 A | | 6/2016 | |
|---|---|---|---|---|
| CN | 105857304 A | | 8/2016 | |
| DE | 102007043599 A1 | | 3/2009 | |
| DE | 102008001136 A1 | | 10/2009 | |
| DE | 102009025058 A1 | | 12/2009 | |
| DE | 102016202322 A1 | | 8/2016 | |
| EP | 2190704 B1 | | 11/2015 | |
| JP | 2006224936 A | * | 8/2006 | |
| KR | 20070102617 A | | 10/2007 | |
| KR | 20140021216 A | | 2/2014 | |
| WO | WO-2015007418 A1 | * | 1/2015 | ............. B62D 9/002 |

OTHER PUBLICATIONS

International Search Report for Application No. PCT/DE2017/100440, dated Sep. 12, 2017, 5 pages.

\* cited by examiner

VEHICLE AND METHOD FOR STEERING THE VEHICLE

CROSS-REFERENCE TO RELATED APPLICATIONS

This application is the U.S. National Phase of PCT/DE2017/100440 filed May 23, 2017, which claims priority to DE 102016215793.0 filed Aug. 23, 2016, the entire disclosures of which are incorporated by reference herein.

TECHNICAL FIELD

The disclosure relates to a vehicle with the features of the preamble of claim 1. The disclosure also relates to a method for steering the vehicle.

BACKGROUND

Through targeted distribution of the drive power to individual wheels, the lateral dynamics of the vehicle can be influenced by wheel-selective traction drives through varying variables relating primarily to longitudinal dynamics. By using wheel-selective traction drives on the steered axle of a vehicle, the wheels can be steered by a targeted adjustment of the differences of the drive power.

The following documents relating to this theme are known: A motor vehicle is disclosed in DE 10 2009 025 058 A1 that comprises a vehicle steering system with a mechanical steering ratio and at least one device for distributing a drive torque to the wheels of a driven vehicle axle in accordance with a predefined distribution target value. A control device is also provided that determines the distribution target value in the linear range of the transverse dynamics in which a normal driver normally moves, depending on signals from sensors on the vehicle and algorithms stored in the control device, such that a yaw torque generated via the vehicle steering unit is superimposed with a supplementary yaw torque generated by the at least one device for distributing a drive torque. As a result, the effects of a direct, indirect or variable steering ratio can be obtained.

A steering angle is defined in DE 10 2007 043 599 A1 in a method for executing a steering procedure in a vehicle by a driver, which is translated via a steering system to a wheel steering angle. A torque distribution between at least one left-hand and one right-hand vehicle wheel is carried out by a supplementary actuator. A variable steering ratio is obtained via the torque distribution, in that a supplementary steering angle is superimposed, via the steering effect of the supplementary actuator, on the steering angle defined by the driver for the movement of the vehicle.

A method for actuating a steering actuator in a vehicle with an adjustable clutch is presented in DE 10 2008 001 136 A1, which enables a variable distribution of the drive torque between a left-hand and a right-hand wheel. According to the document, the steering actuator is controlled, depending on the setting of the clutch, such that a torque acting on the steering caused by a change in the torque distribution is at least partially compensated for.

SUMMARY

The object of the present disclosure is to propose a vehicle and a method for steering the vehicle that improves the steering behavior thereof. This object is achieved by a vehicle and a method as disclosed below. Embodiments of the disclosure can be derived from the description and the attached drawings.

The subject matter of the disclosure is a vehicle. The vehicle is in the form of, e.g., a passenger car, a truck, a bus, etc. The vehicle may have a two-axle and/or two-track configuration.

The vehicle has a steering axle, which may be the front axle. The vehicle also comprises a steering device for steering the steering axle. A steering angle can be input by a driver or a steering actuator via the steering device. By way of example, the steering device has a steering wheel that can be rotated by the driver. When a steering wheel is rotated, the wheels are turned about the steering axis, in particular for turning the vehicle.

The steering of the vehicle via the steering device enables the driver to influence the transverse dynamics of the vehicle, and thus steer the vehicle in the desired direction. The driver's intention is transmitted to the steering device by rotating the steering wheel or the human/machine interface for inputting a steering command in the form of the steering wheel angle $delta_H$, wherein the driver must apply a steering torque ($M_H$).

The vehicle may also have a power steering device, in particular a steering assistance unit (LKU), as well as a first power steering module for activating the steering assistance unit. The power steering module can be a software module, a hardware module, or a combination thereof.

The steering torque in the vehicle with the steering assistance unit is reduced by an actuator, in order to make steering easier for the driver. By way of example, the steering column transfers the movement to the steering gears. The rotational movement of the steering column is translated into the translatory movement of the tie rods. These transfer the movement to the wheel mounts, which execute a rotation (steering angle delta) about the respective steering axle.

The ratio between the steering wheel angle and the turning angle of the wheels is referred to as the kinematic steering ratio $$i_s = \frac{delta_H}{delta}.$$

It determines the steering wheel angle necessary for a certain turning of the wheel, and it also has an effect on how strongly the force applied to the wheels is transferred to the steering wheel. When a moving vehicle turns, forces are generated where the tires are in contact with the roadway that have an effect on the transverse movement of the vehicle. The sum of the transverse forces acting on a wheel acts in the manner of a lateral force, and forms a yaw torque with the longitudinal forces (torque about the vertical axis), that acts on the vehicle body, enabling a turning of the vehicle about the vertical axis.

The forces shall be taken into consideration in the following that affect the contact of the tires with the roadway, and generate the steering wheel torque via wheel mounts, tie rods, and steering gears. The forces and their points of attack on the wheel are regarded as given herein. For a detailed examination of the development of force on the tire contact surface, reference is made to the relevant literature.

A left-hand front wheel with selected suspension points and components of the chassis are shown schematically in FIG. 1, as well as the forces to the tire contact surface (drifting forces). These forces can be broken down into the following components: $F_{W,X}$ (driving and braking force), $F_{W,Y}$ (lateral force) and $F_{W,Z}$ (wheel load). A torque is obtained for each force vector with the resulting leverages about the steering axle (axle between points E and G). The sum of these torques (both wheels) is the steering torque.

With conventional drive concepts in which the drive torques at both wheels are the same, the lateral force $F_{W,Y}$ has the greatest impact on the steering torque according to, e.g. Pfeffer & Harrer, 2013. The return effect caused by the wheel load $F_{W,Z}$ is relatively small (in particular when driving quickly through a turn), and shall not be taken into consideration here. The effect of the driving/braking force $F_{W,X}$ on the steering torque is decisive for the concept of the steering assistance unit that is implemented. For this reason, how the steering torque can be calculated from the two components, $F_{W,Y}$ and $F_{W,X}$ shall therefore be examined below.

As shown in FIG. 1, the force $F_{W,X}$ acts at point W and is perpendicular to the Y,Z plane. In order to determine the effect on the torque on the steering axle, it is assumed that the drive torque is supported in the vehicle body (and not in the wheel mounts), and transferred to the wheel axles via a drive shaft. This is the case with the internal drives that may be used, which include conventional drive trains and the drives in the proximities of the wheels. Because the wheel can only transfer forces to the wheel mounts in the wheel bearings, the force $F_{W,X}$ is shifted to the center of the wheel in order to calculate the torque. The disruptive force leverage $r_a$ that is perpendicular to the steering axle thus represents the effective leverage with which the force $F_{W,X}$ generates a torque on the steering axle.

It is assumed in the following model, that the spreading and castor angles are small. This results in the following relationship between the driving or braking force $F_{W,X}$ and the associated components of the steering torque $M_{A,a/b}$:

$$M_{A,a} \approx F_{W,X} \cdot r_a$$

The lateral force $F_{W,Y}$ does not act at point W, but rather at a point that has been shifted over the subsequent circumference of the tire $r_{\tau,T}$. This results in the following relationship for the components of the steering torque $M_S$ induced by the lateral force:

$$M_S \approx F_{W,y} \cdot (r_{\tau,k} + r_{\tau,T})$$

The steering wheel torque is reduced in the concept of a steering assistance unit by a wheel-selective drives, in that the drive torque is appropriately distributed to the two wheels of the steered axle. In the following derivation, it shall be assumed for purposes of clarity that the spread angle and the castor angle are 0°, the castor path $r_\tau$ and the steering ratio $i_s$ are constant, and the steering angle of both wheels is identical.

When turning left, the forces to the steering system shown in FIG. 2 are obtained. The drive torque is evenly distributed to both wheels, such that the drive force $F_{A,1}=F_{A,r}$ is applied to each wheel. The lateral forces $F_{S,1}$ and $F_{S,r}$ increase when turning. The steering wheel torque is obtained according to:

$$M_H = \frac{1}{i_s}[r_\tau \cdot (\underbrace{F_{S,l}+F_{S,r}}_{=0}) + r_a \cdot (F_{A,l} - F_{A,r})]$$

with an equally distributed drive torque.

The two lateral forces each contribute to the overall torque with the same algebraic sign, while in contrast, the drive forces have a positive and a negative component. With an equal distribution of the drive forces, there effects cancel each other out. At this point, the concept is linked to a steering assistance by a wheel-selective drives. By shifting the drive torque to the wheel on the outside of the curve (on the right in FIG. 2), the two drive forces generate a torque on the steering axle that counteracts the torque of the lateral force.

$$M_H = \frac{1}{i_s}[r_\tau \cdot (F_{S,l} + F_{S,r}) + \underbrace{r_a \cdot (F_{A,l} - F_{A,r})}_{<0}]$$

when the drive torque is shifted to the right-hand wheel.

The redistribution of the drive torques also affects the vehicle transverse dynamics, because both force vectors $F_{A,1}$ and $F_{A,r}$ contribute to the yaw torque (torque about the z-axis of the vehicle) (see Torque Vectoring).

Torque vectoring refers to a method with which the drive torque distribution of a vehicle can be defined in a variable manner for each wheel, or two wheels on the front axle, for example, in order to thus optimize the vehicle behavior in accordance with the driving situation. This is implemented in conventional drives with an internal combustion engine either via two regulated clutches or via a superimposed gearing (axle distribution gearing).

Torque vectoring can be achieved with the vehicle according to the disclosure with a wheel-selective drive, in particular with electric drives for individual wheels, by activating the individual wheel drives. The driving dynamics, in particular the yaw torque, is affected by torque vectoring, by which the following optional applications are obtained:

increase in agility (supplementary yaw torque for improving the turning behavior)

yaw damping (stabilizing yaw torque, counter to the yaw rate)

increase in driving safety improvement of comfort

A further effect of the torque vectoring is the possible reduction of the steering angle requirements as a function of the transverse acceleration. In addition to the torque vectoring, the "electronic stability program" (ESP) represents another possibility for regulating the driving dynamics. ESP only affects the yaw torque by braking individual wheels, however. Torque vectoring can thus be regarded as an extension of the driving dynamic regulation for the drive state.

With steering assistance by a wheel-selective drive, torque vectoring is applied to the steering axle, wherein conventionally, the reduction of the steering wheel torque is of primary interest. The effect on the yaw torque necessarily exists thereby, such that the aforementioned effects also appear to play a role.

The steering assistance device is used to reduce the torque applied to the steering wheel by the driver to a desired level. There may be two fundamental assemblies that can be used: hydraulic power steering (HPS) and electric power steering (EPS), which are standard in current passenger vehicles. With an electromechanical steering assembly, the assistance torque of the power steering is provided by an electric motor, and supplied directly to the steering column or the steering gears, depending on the design. The steering wheel torque is measured via a torque sensor and reported to a control device. This calculates the necessary assistance torque generated by the electric motor from this sensor signal, and supplies it to the steering system via a gearing. Moreover, numerous supplementary functions can be implemented via the control device with an EPS system that enables the use of modern driver assistance systems (e.g. parking assistance, lane departure warning systems).

There may also be a superimposed steering system. The superimposed steering system alters the steering ratio in that it introduces an adjustment angle into a superimposing gearing, in addition to the steering wheel angle assumed by the driver, without changing the angle of the steering wheel. The direction of the steering is thus adjusted, depending on the driving state. As a result, a stable, indirect steering behavior (high steering ratio) can be obtained at high speeds, and a direct, agile steering (low steering ratio) can be obtained for city driving and when parking. It is also possible for the assistance system to implement stabilizing steering controls, without sending a disruptive message to the driver. The superimposed steering system may be implemented with the components described above. In some embodiments, the vehicle does not have a superimposed steering system.

The vehicle has a first drive, wherein the first drive enables a wheel-selective distribution of a first drive torque to the wheels on the steering axle. It is thus possible to provide a higher drive torque to one wheel on the steering axle than the other wheel. The distribution takes place selectively, with an acceleration or braking of the wheels.

The vehicle also has a drive axle with a second drive. The drive axle may be the rear axle. The second drive enables a wheel-selective distribution of a second drive torque to the wheels on the drive axle. The distribution takes place selectively, with an acceleration or braking of the wheels.

It is proposed in the framework of the disclosure that the drive train have a control device, which records input values. By way of example, the control device has a corresponding information technology and/or signal technology interface for acquiring the input values.

The input values form driving dynamic values for the vehicle. The driving dynamic values enable determination of a change in the steering ratio, as is implemented, e.g., through the use of torque vectoring, etc. The control device provides regulating data as the output value. The control device has an information technology and/or signal technology interface for this. The output data represents regulating data for distributing the drive torque of the second drive to the two wheels on the drive axle. The control device can be programmed and/or configured to determine the output values, in particular regulating data, such that the change in the steering ratio is reduced or even entirely compensated for.

One consideration of the disclosure is that through altering the distribution of the drive torque to the drive axle, elastic deformations in the steering device and/or caused by torque vectoring are compensated for. A change in the steering ratio can thus be reduced or entirely avoided.

In principle, the wheel-selective drive of the steering axle and/or the drive axle can comprise two independent drives in the vicinity of the wheels. It is also possible for each of these to be a motor, wherein the wheel-selective distribution takes place with a gearing. In a preferred embodiment of the disclosure, the wheel-selective drive of the steering axle and/or the drive axle is obtained with two electric motors, wherein each of the driven wheels has a dedicated electric motor. In particular, the electric motors are motors in the proximity of the wheels, in particular wheel-hub motors. No structural supplements are necessary in this embodiment for using the wheel-selective drive in accordance with the disclosure.

In an embodiment of the disclosure, the control device may be configured to determine the output values such that the steering ratio remains constant. In particular, a graph describing the steering wheel angle as a function of the turning angle comprises a straight line.

In an alternative embodiment of the disclosure, the control device is configured to determine the output values such that a target value is applied to the steering ratio. It is possible then for the target value to change, e.g. depending on the speed of the vehicle.

The control device may be configured to compensate for elastokinematic effects. If effects occur that lead to a deformation of the steering system, in particular the steering axle and/or the steering device, which in turn lead to a change in the steering ratio, the control device is configured to reduce or fully compensate for the elastokinematic effects in the steering system.

In an alternative or supplementary embodiment of the disclosure, the input values comprise a change in the torque distribution to the wheels of the steering axle. This change in the drive torque distribution to the wheels on the steering axle is obtained, for example, with the aforementioned torque vectoring. The control device alters the output values based on the change in the drive torque distribution to the steering axle in order to reduce or fully compensate for changes in the steering ratio.

In a structural design of the disclosure, the drive train has a torque vectoring control device, wherein the torque vectoring control device alters the torque distribution in the steering axle.

The drive torque distribution in the drive axle may be countered equally by the drive torque distribution in the steering axle. This counteraction in the distribution results in a reduction in, or full compensation for the change in the steering ratio. A counteracting distribution means that one side of the vehicle is subjected to a higher drive torque on the one axle and the other side of the vehicle is subjected to a higher drive torque on the other axle.

Another aspect of the disclosure relates to a method for steering the vehicle, as described above, or according to any of the preceding claims. The control device acquires an input value, forming a driving dynamics value for the vehicle. The control device determines an output value based on the input values, which forms a regulating datum for distributing the drive torque of the second drive. The control device determines the output value such that the change in the steering ratio of the vehicle is reduced or fully compensated for, or can be attributed to a target value.

The temporal length of the change in the steering ratio may correspond to the temporal length of the asymmetrical distribution of the drive torques of the second drive. Alternatively or additionally, the temporal lengths of the change and the temporal change of the length of the asymmetrical distribution of the drive torque of the second drive are the same length. In particular, the control device is a causal system, wherein the input values form an input signal and the output values form a causal system response thereto.

BRIEF DESCRIPTION OF THE DRAWINGS

Further features, advantages and effects of the disclosure can be derived from the following description of an embodiment of the disclosure, and the drawings. Therein.

Figure 1:
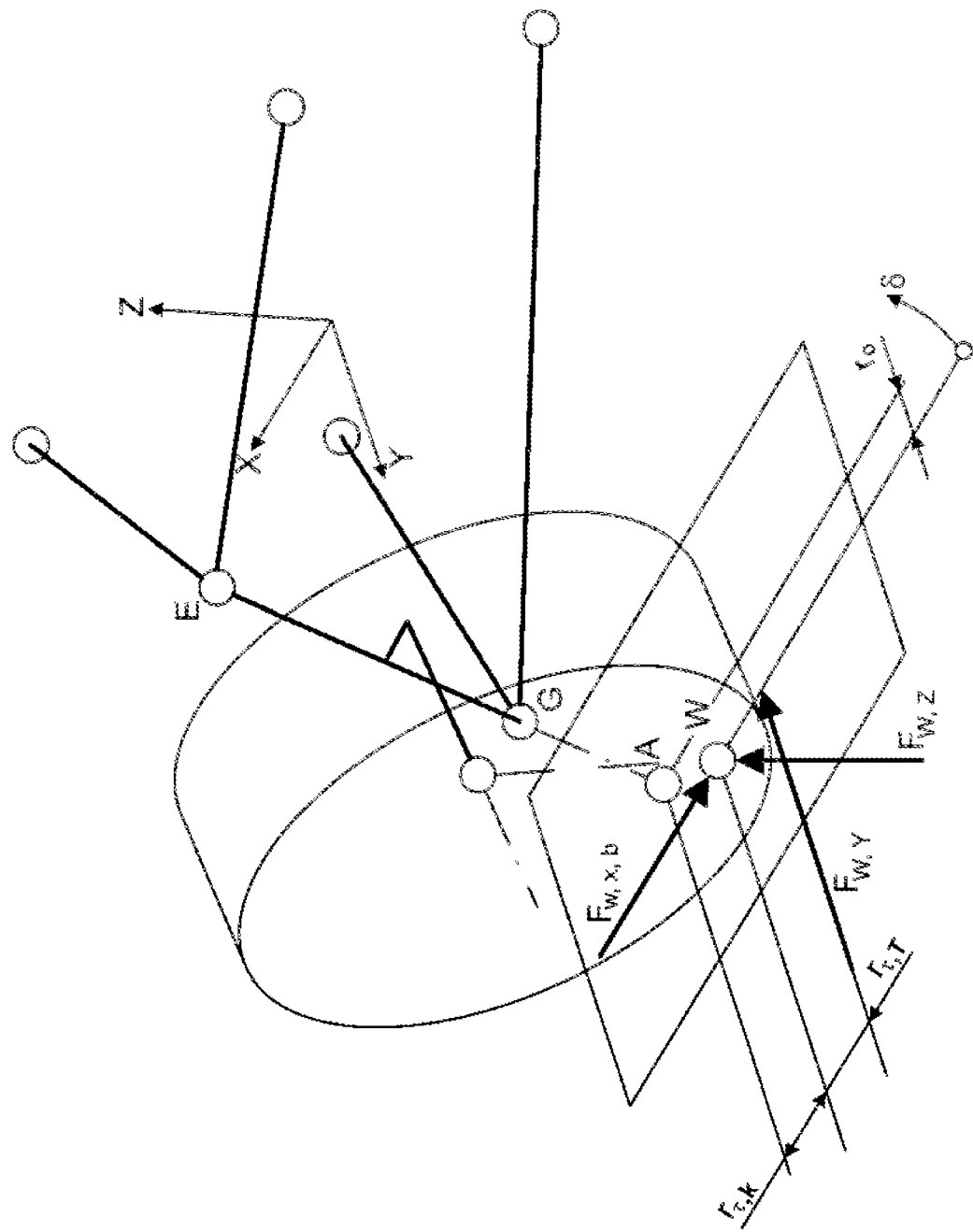
FIG. 1 shows forces affecting the tire/roadway contact of the left-hand front wheel, by way of example, according to Pfeffer, P. & Harrer, M. (ed. 2013), Steering Handbook.
Figure 2:
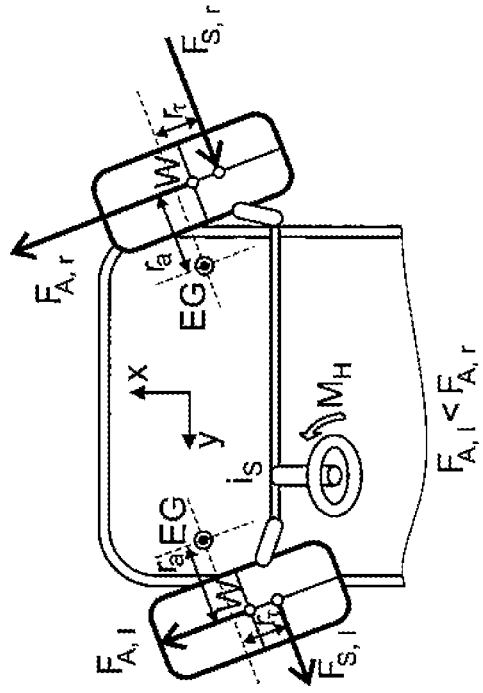
Figure 2:
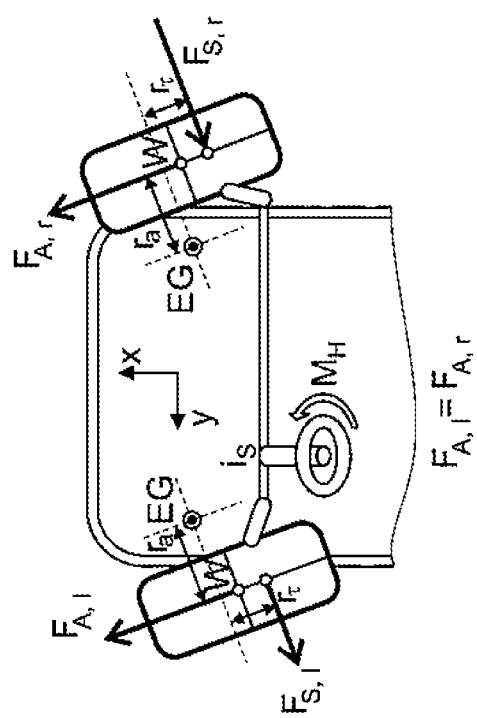
Figure 3:
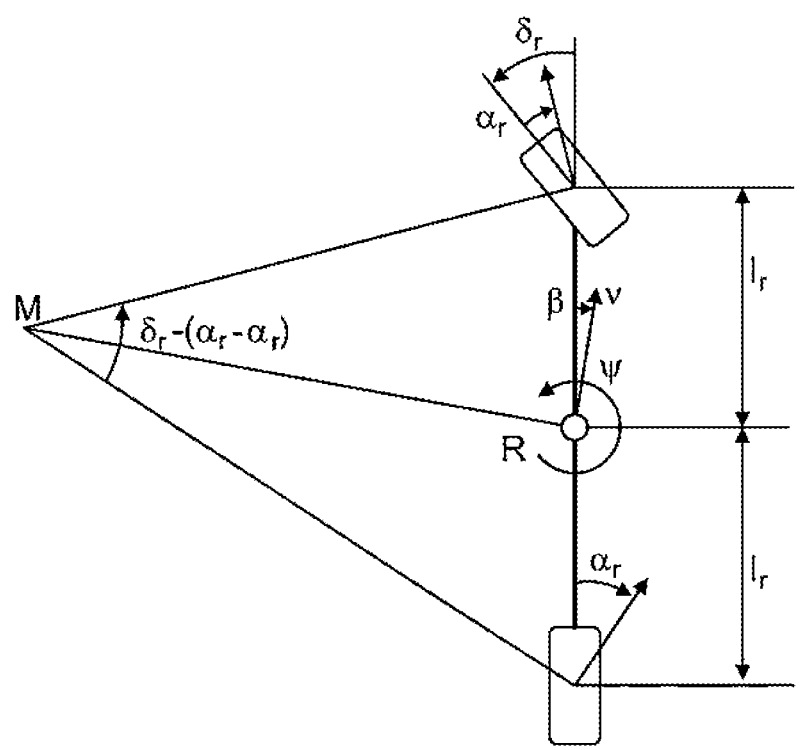
Figure 4:
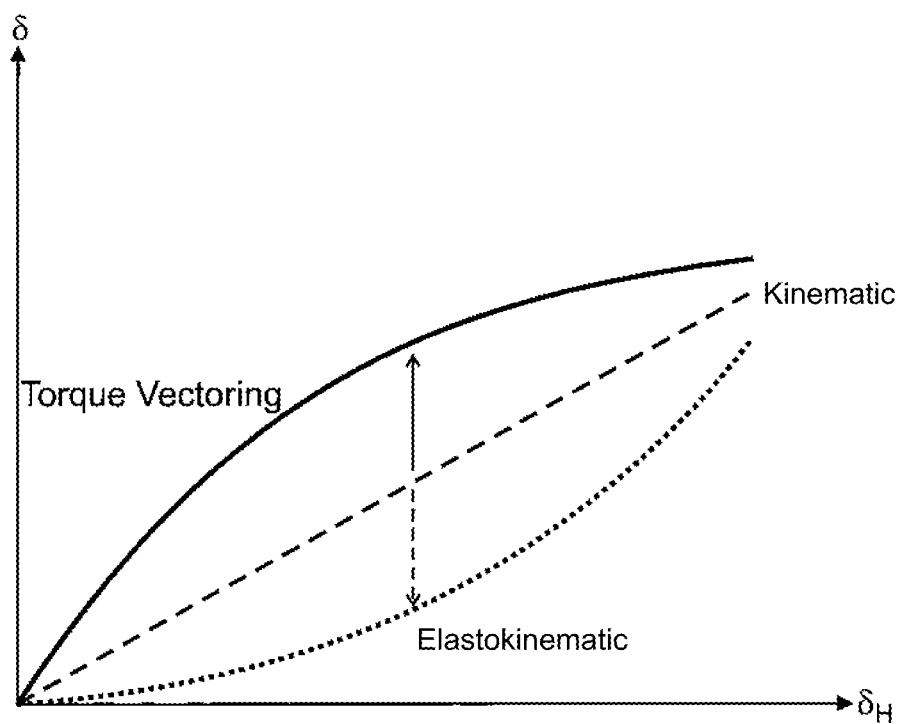
Figure 5:
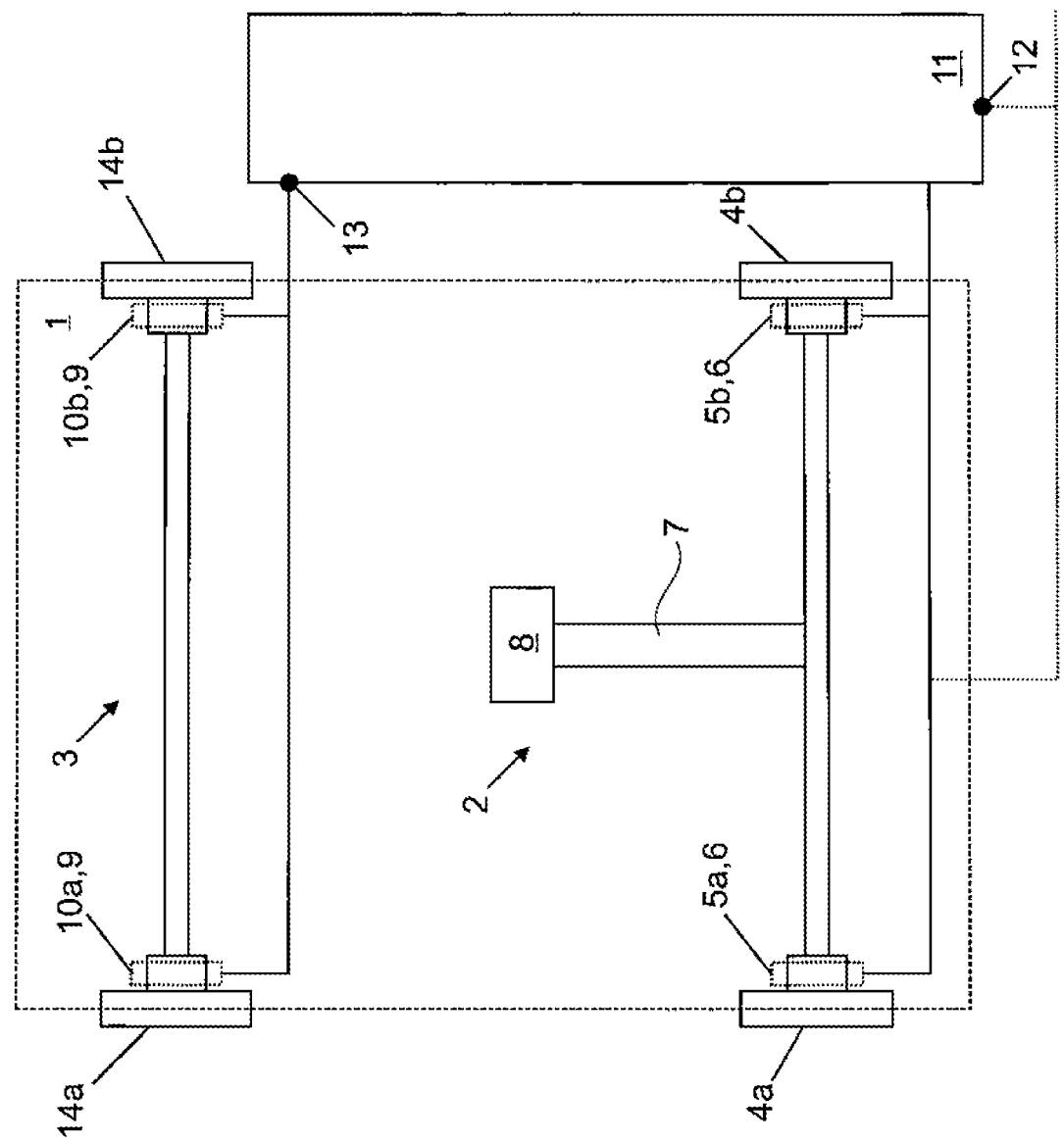

Steering Systems, Steering Feel, Driving Dynamics of Motor Vehicles, Wiesbaden; Springer Publishers;

FIG. 2 illustrates the operating principle of a steering assistance by a wheel-selective drives; on the left without, and on the right with, steering assistance; the steering geometry is simplified (spreading angle 0°, castor angle 0°), FIG. 3 shows a linear single-track model of a steering system, in a stationary curve;

FIG. 4 shows a graph for depicting the steering angle as a function of the steering wheel angle, the effects of torque vectoring and the elastokinematics;

FIG. 5 shows a schematic view of a vehicle for implementing the method.

DETAILED DESCRIPTION

In order to execute a curve with a defined radius R (according to the single-track model in FIG. 3) in a vehicle with a wheel state 1, a steering angle σ comprised of an Ackermann steering angle and the difference between the drifting angle $\alpha_v$ and $\alpha_h$ requires that:

$$\delta = \frac{l}{R} + \alpha_v - \alpha_h$$

There is a defined relationship between the steering wheel angle and the steering angle also referred to as turning angle due to kinematic relationships/chains in the steering system. If the system is regarded as rigid, and no elastic effects take place, this relationship is referred to as the steering ratio. The relationship between the steering wheel angle and the steering angle does not remain constant in general during the driving operation due to elastic deformations of the steering system, including the wheel mounts (forces and wheel suspension). These elastic deformations act against a steering movement, the steering system is "forced" into a position in which it is directed for driving in a straight line. With greater forces effecting the steering torque, the elastic deformation is also greater, as well as the effort required of the driver for steering. This means that the necessary steering wheel angle for driving through a curve is increased. The steering wheel angle necessary for obtaining a steering angle at the wheel is referred to below as the required steering wheel angle.

This required steering wheel angle is also affected by the torque vectoring generated by the wheel-selective drives. The yaw torque caused by the torque vectoring (benefiting the turning behavior) reduces the front drifting angle and also increases the rear drifting angle. As is clear from the relationship specified in the introduction, this results in a smaller steering angle for obtaining the same curving radius than with conventional systems. Furthermore, by reducing the front drifting angle, the lateral forces at the front are reduced. This reduces the return forces and thus has a further effect on the steering torque/steering wheel torque. The electromechanical effects are also affected, resulting in a further reduction in the required steering wheel angle. These two effects are schematically depicted in FIG. 4. When the steering wheel angle remains the same, the effective steering angle is increased by the torque vectoring, or the necessary steering wheel angle is reduced for the same curving radius, respectively. A complementary effect is obtained through the elastokinematic effects. In this case, the effective steering angle is reduced when the steering wheel angle remains the same, or the required steering wheel angle is increased when driving through the same curving radius.

FIG. 5 shows a vehicle 1 for implementing the method according to the disclosure in a schematic illustration. The vehicle 1 has a steering axle 2 and a drive axle 3. Driven wheels 4a, b are located on the steering axle 2, wherein the driven wheels 4a, b are powered by a first wheel-selective drive 6, formed by two electric motors 5a, b. The electric motors 5a, b are disposed directly on the driven wheels 5a, b. By way of example, the electric motors 5a, b are wheel-hub motors. Each of the driven wheels 4a, b has an exclusive, dedicated electric motor 5a, b. The vehicle 1 has a steering device 7, which has a steering wheel 8 for inputting a steering wheel angle. A steering torque is transferred via the steering device 7 to the wheels 4a, b, such that they are turned about a turning angle.

The drive axle 3 has a second drive 9, implemented by two electric motors 10a, b, forming wheel-hub motors. As a result, the drive axle 3, in particular the wheels 14a, b can be subjected to a second wheel-selective drive torque. The electric motors 5a, b, 10a, b, or the first and second drives 6, 9 are connected to a control device 11 for exchanging signals. The control device 11 controls the distribution of the drive torque in the wheel-selective drives 6, 9.

The control device 11 has an input signal interface 12 for acquiring driving dynamics values of the vehicle 1 as input values. Depending on the operating mode, the driving dynamics values may represent a speed of the vehicle or a drive torque distribution to the steering axle 2 by the wheel-selective drive 6.

Furthermore, the control device 11 has an output interface 13, which enables the outputting of a regulating datum as an output value for distributing the drive torque of the second drive 9, and the forwarding of this value to the electric motors 10a, b.

The control device 11 can be programmed and/or configured to calculate or determine the output values based on the input values, such that changes in the steering ratio do not occur due to driving dynamics values, or are compensated for or at least reduced.

A typical case in which changes in the steering ratio are compensated for takes place due to the elastokinematic deformations in the steering device 7, or in the overall steering system. These elastokinematic deformations result from transverse torques applied to the steering device 7, wherein the effects are illustrated in FIG. 4. With an asymmetrical distribution of drive torques in the drive axle 3, these effects can be reduced or even fully compensated for.

In another situation, torque vectoring is used, wherein the drive torques of the two electric motors 5a, b are distributed asymmetrically to the steering axle 2. This asymmetric distribution results in a change to the steering ratio. With a counteracting asymmetrical drive torque distribution in the drive axle 3, this effect to the change in the steering ratio can be reduced or even fully compensated for.

LIST OF REFERENCE SYMBOLS 1 vehicle
2 steering axle
3 drive axle
4a, b wheels of the steering axle
5a, b electric motor
6 first drive
7 steering device
8 steering wheel
9 second drive 10a, b electric motors
11 control device
12 input interface
13 output interface
14a, b wheels of the drive axle

The invention claimed is:

1. A vehicle comprising:
a steering device configured to steer a steering axle and a steering angle can be input via the steering device, wherein the steering device transfers a steering torque to one or more wheels of the steering axle, which results in a turning angle of one or more wheels of the steering axle, wherein a quotient of the steering wheel angle divided by the turning angle defines a steering ratio; a first drive, wherein the first drive enables a wheel-selective distribution of a first drive torque to the wheels of the steering axle; and a drive axle and a second drive, wherein the second drive enables a wheel-selective distribution of a drive torque to the wheels of the drive axle, a control device for recording input values, wherein the input values form driving dynamics values for the vehicle, wherein the driving dynamics values enable a determination of a change in the steering ratio, and output a regulating datum, as an output value for distributing the drive torque of the second drive in order to reduce the change in the steering ratio, or fully compensate for the change in the steering ratio, or which can be attributed to a target value dependent on a speed of the vehicle, wherein asymmetrical distribution of drive torques in the drive axle are applied to the output value in response to elastokinematic deformations associated with the input values of the steering device to adjust the steering ratio.

2. The vehicle of claim 1, wherein the first drive or the second drive are wheel-selective drives.

3. The vehicle, of claim 1, wherein the control device is configured to determine the output values such that the steering ratio remains constant.

4. The vehicle of claim 1, wherein the control device is configured to determine the output values such that the steering ratio can be attributed to the target value.

5. The vehicle of claim 4, wherein the control device is configured to compensate for elastokinematic effects in the steering device.

6. The vehicle of claim 5, wherein the input values comprise a change in the drive torque distribution in the wheels of the steering axle, wherein the control device changes a regulating value based on the change in the drive torque distribution.

7. The vehicle of claim 6, wherein the vehicle further includes a torque vectoring control device configured to alter the drive torque distribution to the steering axle.

8. The vehicle of claim 7, wherein the drive torque distribution in the drive axle counteracts the drive torque distribution in the steering axle.

9. The vehicle of claim 1, wherein the control device is configured to acquire input values forming driving dynamics values for the vehicle, wherein the control device is further configured to determine an output value based on the input values, which forms the regulating datum for distributing the drive torque of the second drive.

10. A vehicle comprising:
a steering axle;
a steering device configured to steer the steering axle, wherein a steering wheel angle can be input via the steering device, wherein the steering wheel angle leads to a steering angle of both wheels of the steering axle; and a quotient of the steering wheel angle to the steering angle defines a steering ratio;
a first drive, wherein the first drive allows a wheel-selective distribution of a first torque to the wheels of the steering axle;
a second drive, wherein the second drive allows a wheel-selective distribution of a second torque to each of the both wheels of a drive axle; and
a controller configured to receive input variables defining driving dynamic variables of the vehicle, wherein the drive dynamic variables allow a change in the steering ratio to be ascertained, and the controller outputs control information for distributing drive torque of the second drive as an output value in order to reduce or compensate for the change, wherein asymmetrical distribution of drive torques in the drive axle are applied to the output value in response to elastokinematic deformations associated with the input values of the steering device to adjust the steering ratio.

11. The vehicle of claim 10, wherein driven wheels are powered by the first drive, wherein the first drive is formed by one or more electric motors.

12. The vehicle of claim 11, wherein the one or more electric motors are disposed directly on the driven wheels.

13. The vehicle of claim 10, wherein the vehicle further includes a torque vectoring control device configured to alter the drive torque distribution to the steering axle.

14. The vehicle of claim 13, wherein the drive torque distribution in the drive axle counteracts the drive torque distribution in the steering axle.

15. A method for a vehicle, comprising:
determining a steering wheel angle from a steering device configured to steer a steering axle of the vehicle;
determining a steering angle of both wheels of the steering axle;
determining a steering ratio based upon a quotient of the steering wheel angle to the steering angle;
wheel-selectively distributing a first torque to both wheels of the steering axle via a first drive;
wheel-selectively distributing a second torque to the wheels of both wheels of the driving axle via a second drive;
receiving input variables defining driving dynamic variables of the vehicle, wherein the drive dynamic variables allow a change in the steering ratio to be ascertained; and
outputting control information for distributing drive torque of the second drive as an output value in order to reduce or compensate for the change, wherein asymmetrical distribution of drive torques in the drive axle are applied to the output value in response to elastokinematic deformations associated with the input values of the steering device to adjust the steering ratio.

16. The method of claim 15, wherein the method further includes powering driven wheels by the first drive; the first drive is formed by one or more electric motors.

17. The method of claim 15, wherein the method further includes acquiring driving dynamics values of the vehicle as input values.

18. The method of claim 17, wherein the driving dynamics values represent a speed of the vehicle or a drive torque distribution to the steering axle.

19. The method of claim 17, forming a regulating datum for distributing drive torque of the second drive utilizing the input values.

* * * * *